United States Patent [19]

Tanimizu

[11] Patent Number: 5,331,146
[45] Date of Patent: Jul. 19, 1994

[54] CONTACT-TYPE IMAGE SENSOR FOR GENERATING ELECTRIC SIGNALS CORRESPONDING TO AN IMAGE FORMED ON A DOCUMENT

[75] Inventor: Hiromi Tanimizu, Tokyo, Japan

[73] Assignee: Kabushiki Kaisha Toshiba, Kawasaki, Japan

[21] Appl. No.: 20,722

[22] Filed: Feb. 22, 1993

[30] Foreign Application Priority Data

Feb. 28, 1992 [JP] Japan .................................. 4-043438
Dec. 11, 1992 [JP] Japan .................................. 4-331336

[51] Int. Cl.⁵ ............................................. H01J 40/14
[52] U.S. Cl. .................................. 250/208.1; 358/484
[58] Field of Search ................... 250/208.1, 227.2; 358/494, 482, 483, 484, 213.11

[56] References Cited

U.S. PATENT DOCUMENTS

| | | | |
|---|---|---|---|
| 4,990,764 | 2/1991 | Yokochi et al. | 250/208.1 |
| 5,038,027 | 8/1991 | Ioka | 250/208.1 |
| 5,081,347 | 1/1992 | Matsumoto | 250/208.1 |
| 5,187,596 | 2/1993 | Hwang | 358/482 |
| 5,194,725 | 3/1993 | Sawase et al. | 250/208.1 |
| 5,214,273 | 5/1993 | Yokochi | 358/484 |

FOREIGN PATENT DOCUMENTS 0368681 5/1990 European Pat. Off. .
0465768A2 1/1992 European Pat. Off. .
59-122273(A) 7/1984 Japan .

OTHER PUBLICATIONS

Patent Abstracts of Japan, vol. 8, No. 243 (E-277) (1680) Nov. 8, 1984.
Patent Abstracts of Japan, Publication No. JP62026971; Publication Date Feb. 4, 1987; Kinoshita Naoki et al. "Contact Sensor".

Primary Examiner—David C. Nelms
Assistant Examiner—Stephone B. Allen
Attorney, Agent, or Firm—Finnegan, Henderson, Farabow, Garrett & Dunner

[57] ABSTRACT

Light-shielding layers are adhered to the lower surface of a glass plate, spaced apart from each other and defining a slit having a width of L. An array of rod lenses is located below the glass plate, such that the optical axes of the lenses pass through the slit. The lower surface of the glass plate is generally covered, and exposed via the slit only. Hence, the leakage of lights reflected from points near a reading position into each photoelectric conversion element is minimized, whereby the element outputs a pixel signal faithfully representing that part of the image which is located at the reading position.

21 Claims, 3 Drawing Sheets

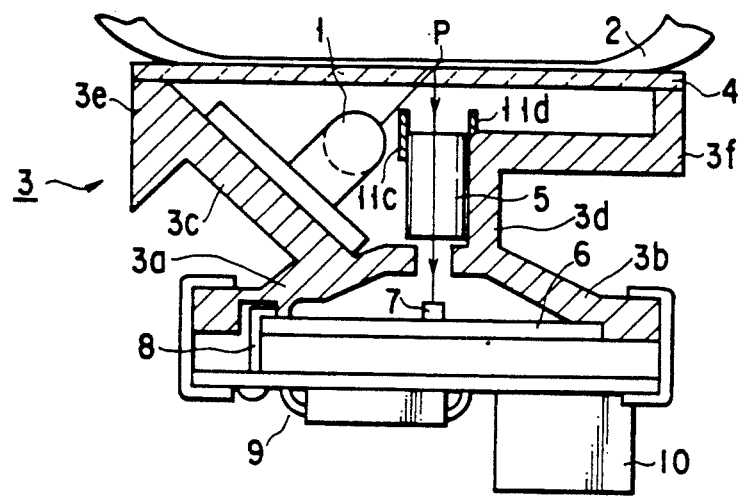
F I G. 4
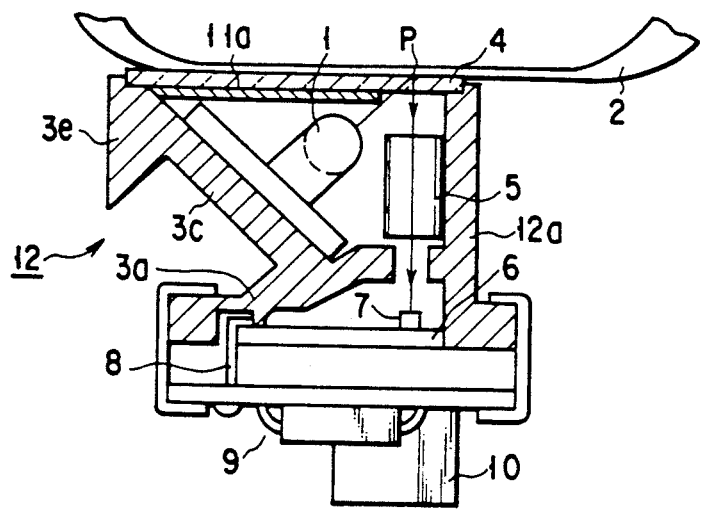
F I G. 5
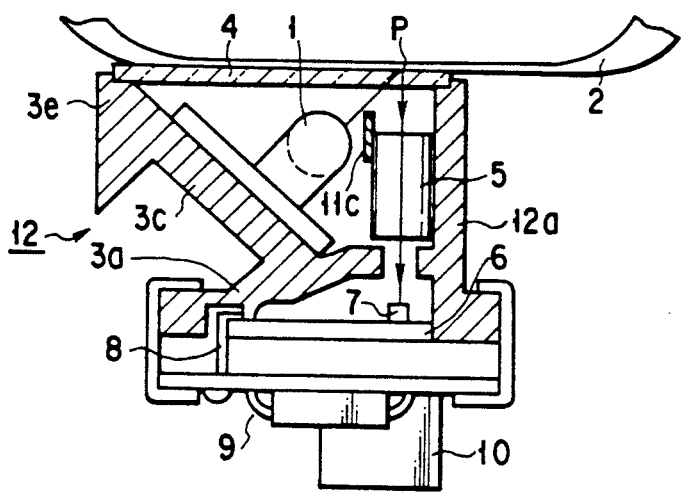
F I G. 6

# CONTACT-TYPE IMAGE SENSOR FOR GENERATING ELECTRIC SIGNALS CORRESPONDING TO AN IMAGE FORMED ON A DOCUMENT

BACKGROUND OF THE INVENTION

1. Field of the Invention

The present invention relates to a contact-type image sensor which has photoelectric conversion elements for converting light reflected from a document to electric signals corresponding to an image formed on the document, and more particularly, to a structure which reduces the leakage of unnecessary light into the photoelectric conversion elements.

2. Description of the Related Art

A contact-type image sensor comprises a light source, an erect-image focusing optical system, and a line sensor. The light source applies light to a document. The optical system, such as a rod-lens array, receives the light reflected from the document and focuses an erect image on the light-receiving surface of the line sensor, with a magnification of one. The line sensor has a linear array of photoelectric conversion elements, which have a length substantially equal to the width of the document. The photoelectric conversion elements convert the image focused by the optical system, to electric signals. In other words, the line sensor generates electric signals (image signals) which correspond to the image formed on the document.

The rod lens array comprises a number of rod lenses juxtaposed in the same direction as the photoelectric conversion elements, with their optical axes aligned parallel to each other. Each of the rod lenses has two focal points located at the same distance from the midpoint on the axis of the lens. The document is placed in the plane containing the first focal point of every rod lens, whereas each photoelectric conversion element is located at the second focal point of the corresponding rod lens. Hence, the document opposes the photoelectric conversion elements, with the rod lens array interposed between the document, on the one hand, and the conversion elements, on the other hand.

FIG. 7A illustrates the positional relationship among each rod lens 71, the document 72, and each photoelectric conversion element 73. As is evident from FIG. 7A, the light reflected from a given point P1 on the document 72 (i.e., the point corresponding to one pixel) is focused by the rod lens 71 on the light-receiving surface of the conversion element 73, which is located at point P2 opposing the point P1.

If rod lens 71 has ideal characteristics, the light focused at point P2 should be exclusively the light reflected from the point P1 on the document 72. Referring to FIG. 7B, the light A reflected from a point P3 spaced part from the point P1 should be focused at a point P4 which is symmetrical to the point P3 as is indicated by the arrow B, after passing through the rod lens 71.

However, the rod lens can hardly have such ideal characteristics, due to the limited manufacturing precision. A stray light is inevitably generated in the lens 71 as any light passes through the lens 71. Consequently, there is the possibility that the light reflected from any point (including the point P3) near the point P1, as well as the light reflected from the point P3, may be applied to the light-receiving surface of the photoelectric conversion element 73. Thus, the conversion element 73 generates a pixel signal which is superposed with the components corresponding to the stray lights resulting from the lights reflected from points other than the point P1.

This problems will be described in greater detail, with reference to FIGS. 8A, 8B, and 9.

FIG. 8A illustrates the case where a white line on a black background is to be read. As shown in the figure, the point P1 is on the white line so that the white line may be read. However, the light reflected from any point within a circle S, the center of which is the point P1, are focused on the photoelectric conversion element 73 because of the characteristics of the rod lens 71. Hence, the lights reflected from those parts S1 and S2 of the black background, which are within the circle S, are also applied through the lens 71 to the photoelectric conversion element 73. The element 73 therefore receives less light than in the case where no dark parts of an image are located within the circle S, as is illustrated in FIG. 8B. As a result, as is shown in FIG. 9, the voltage OA output by the element 73 is lower than the voltage OB the element 73 should generate if no dark parts of an image were located within the circle S.

Thus, although the point P1 is placed on the white line to read the line, the voltage output by the transducer element 73 changes in accordance with the condition of those parts of the image which are located near the point P1. As a consequence, the pixel signal output by the element 73 is one influenced by the parts of the image which are near the reading position.

SUMMARY OF THE INVENTION

The object of the invention is to provide a contact-type image sensor which can generate a signal faithfully representing a part of an image, which is located at a reading position, by minimizing the influence of other parts of the image which are located near the reading position.

The object is attained by a contact-type image which comprises:

a light source for applying light to a document from which to read an image;

photoelectric conversion means for generating electric signals from an incident light;

an optical system for guiding to the photoelectric conversion means the light applied from the light source and reflected from a predetermined position on the document; and light-shielding means for reducing an amount of light which is other than the light reflected from the predetermined position and which is incident on the optical system.

Also, the object of the invention is attained by a contact-type image sensor which comprises:

an document table for supporting a document from which to read an image;

a light source for applying light to the document supported on the document table;

photoelectric conversion means for generating electric signals from an incident light;

support means having a wall extending linearly to the document table;

an optical system secured to the wall of the support means, for guiding to the photoelectric conversion means the light applied from the light source and reflected from a predetermined position on the document; and light-shielding means for reducing an amount of light which is reflected from a position closer to the light source than the predetermined position and which is incident on the optical system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a sectional view showing a contact-type image sensor according to a third embodiment of the present invention;

FIG. 5 is a sectional view illustrating a contact-type image sensor according to a fourth embodiment of the present invention;

FIG. 6 is a sectional view showing a contact-type image sensor according to a fifth embodiment of the present invention;

DETAILED DESCRIPTION OF THE PREFERRED EMBODIMENTS

The embodiments of the invention will be described with reference to the accompanying drawings.

First Embodiment

Figure 1:
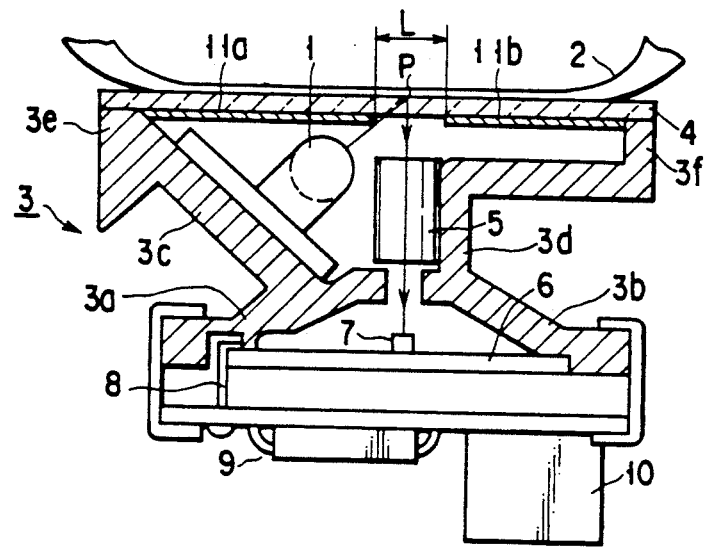
FIG. 1 is a sectional view showing a contact-type image sensor according to a first embodiment of the present invention.

FIG. 1 is a sectional view showing a contact-type image sensor according to the first embodiment of the invention. As shown in FIG. 1, the image sensor comprises an LED array 1, a support 3, a glass plate 4, a rod-lens array 5, a line sensor 6, a terminal 8, a circuit board 9, a connector 10, and light-shielding layers 11a and 11b.

The LED array 1 applies light to the document 2 placed on the glass plate 4. The LED array 1 includes a number of LEDs, has a length greater than the reading width of the document 2, and is fastened to the support 3.

The support 3 is a little longer than the LED array 1. It has a cross section shaped like a letter X as is shown in FIG. 1, and has sensor-holding portions 3a and 3b, an LED-holding portion 3c, a lens-holding portion 3d, and plate-holding portion 3e and 3f. The portion 3c extends upwards, outwardly and slantwise from the sensor-holding portion 3a. The lens-holding portion 3d extends vertically from the upper end of the sensor-holding portion 3b. The plate-holding portion 3e is connected to the upper end of the LED-holding portion 3c. The plate-holding portion 3f extends outwardly and horizontally from the upper end of the portion 3d.

The glass plate 4 allows an adequate passage of light. It is fastened to the plate-holding portions 3e and 3f of the support 3. The plate 4 serves as a document table, on which the document 2 is placed.

The rod-lens array 5 comprises a predetermined number of rod lens. Each rod lens is a "refractive index distributed type" whose refractive index continuously decreases from the center toward the periphery in the radial direction. Further, each rod lens has two focal points which are located at the same distance from the midpoint on the axis of the lens. The rod lenses are arranged side by side, with their optical axes extending parallel to one another. The rod-lens array 5 is fastened to the lens-holding portion 3d of the support 3. It is positioned such that the optical axes of the lenses extend at right angles to the upper surface of the glass plate 4, the first focal point of each rod lens is located at a point P close to the upper surface of the glass plate 4, and rod lenses are juxtaposed in the lengthwise direction of the support 3.

The line sensor 6 comprises a number of photoelectric conversion elements 7 arranged linearly and is designed for a serial image signal which consists of the signals generated by the elements 7. The sensor 6 is held by the sensor-holding portions 3a and 3b of the support 3, such that the light-receiving surfaces of the elements 7 are located at the second focal points of the rod lenses, respectively. The sensor 6 is electrically connected by the terminal 8 to the circuit board 9.

The circuit board 9 includes various electronic circuits, among which are a circuit for driving the line sensor 6 and a circuit for processing the serial signal output by the sensor 6. The connector 10 is mounted on the circuit board 9 for supplying and receiving signals to and from a facsimile device or the like with which the contact-type image sensor is used in combination.

The light-shielding layers 11a and 11b formed on the lower surface of the glass plate 4, spaced apart from each other for a distance L. They cover the entire lower surface of the plate 4 except for a rectangular region having a width of L. In other words, they define a rectangular slit which has a width of L and which extends parallel to the rod-lens array 5. The layers 11a and 11b may be plates or films made of opaque material and adhered to the lower surface of the glass plate 4. Alternatively, they may be formed by coating or printing opaque paint on the lower surface of the glass plate 4.

Figure 2:
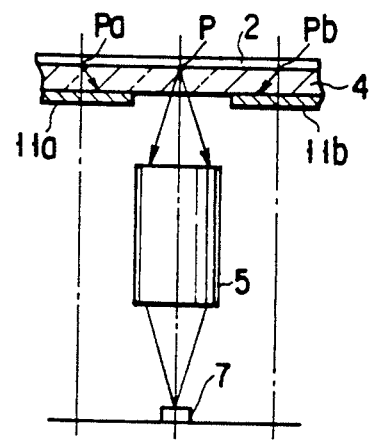
FIG. 2 is an enlarged view illustrating the main part of the image sensor shown in FIG. 1.

In operation, the light-shielding layers 11a and 11b shield the lights which have been reflected from points Pa and Pb (FIG. 2) rear the point P, i.e., the reading position or the first focal point of any rod lens of the array 5, preventing them from reaching the rod-lens array 5. The layers 11a and 11b shield almost all lights that may generate stray light in the rod lens; a very small amount of stray light is generated, if any, in the rod-lens array 5. As a result, the leakage of lights reflected from points near the point P (i.e., the reading position), to each photoelectric conversion element 7 is minimized. Hence, the pixel signal generated by the element 7 and representing that part of an image which is located at the point P is minimally influenced by the parts of the image which are located near the point P. In other words, the element 7 outputs a pixel signal faithfully representing that part of the image which is located at the point P.

The gap L between the light-shielding layers 11a and 11b is made as short as possible, but long enough to allow light reflected from the point P to reach each rod lens in a sufficient amount such that the element 7 generates a complete pixel signal.

Second Embodiment

Figure 3:
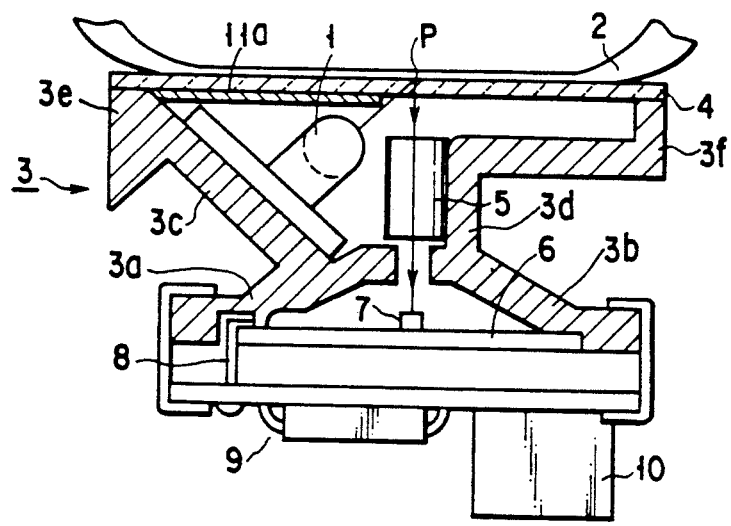
FIG. 3 is a sectional view showing a contact-type image sensor according to a second embodiment of the present invention.
Figure 7A:
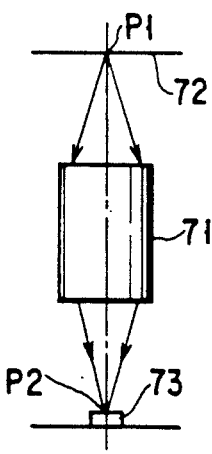
FIG. 7A is a diagram representing the requirements of an ideal characteristic rod lens incorporated in a conventional contact-type image sensor.
Figure 7B:
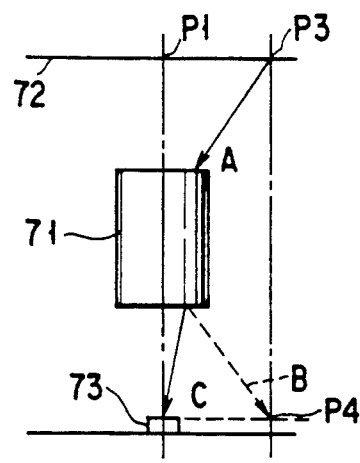
FIG. 7B is a diagram representing the characteristics of a rod lens incorporated in a conventional contact-type image sensor.
Figure 8A:
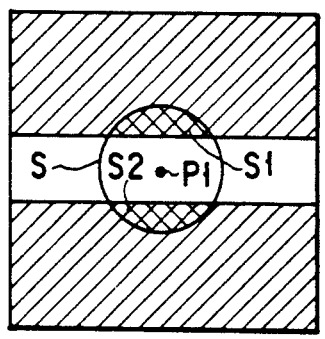
FIG. 8A is a diagram showing a portion of a document having a white line on a black background, from which an image is read by one photoelectric conversion element of a conventional contact-type image sensor.
Figure 8B:
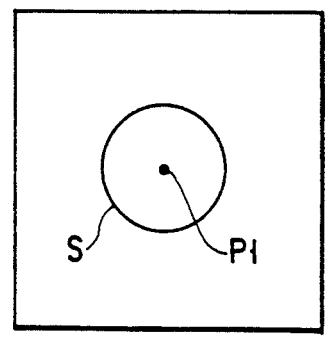
FIG. 8B is a diagram showing a portion of a document or a blank sheet of paper, from which an image is read by the conversion element of the conventional contact-type image sensor.
Figure 9:
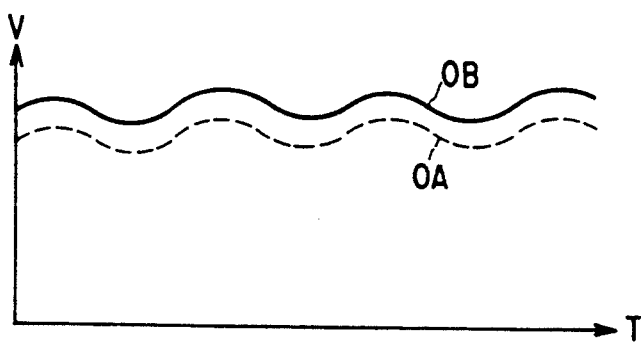
FIG. 9 is a graph representing the voltage generated by the conversion element from the light reflected from the portion of the document shown in FIG. 8A, and the voltage the conversion element generates from the light reflected from the portion of the document shown in FIG. 8B.

FIG. 3 is a sectional view showing a contact-type image sensor according to a second embodiment of the present invention. In FIG. 3, those components which are identical to those shown in FIG. 1 are designated with the same reference numerals. The identical components will not be described in detail.

The second embodiment differs from the first in that only one light-shielding layer, i.e., a layer 11a opposing the LED array 1, is used, employing no layer equivalent to the light-shielding layer 11b. With the second embodiment having this specific structure, it is also possible to reduce the leakage of light beams reflected from points near the point P (i.e., the reading position), to each photoelectric conversion element 7. As a result, the element 7 outputs a pixel signal faithfully representing that part of the image which is located at the point P.

However, the leakage of lights reflected from points near the point P to each conversion element 7 is slightly greater than in the first embodiment since no use is made of a layer equivalent to the layer 11b. Nonetheless, the leakage of these lights is decreased significantly more than in the conventional contact-type image sensor. This is because the light-shielding layer 11b is located farther from the LED array 1 than the light-shielding layer 11a and, thus, receives less light reflected from the glass plate 4 than does the light-shielding layer 11a.

Third Embodiment

FIG. 4 is a sectional view showing a contact-type image sensor according to a third embodiment of the present invention. In FIG. 4, those components which are identical to those shown in FIG. 1 are designated with the same reference numerals. The identical components will not be described in detail.

The third embodiment differs from the first in that the light-shielding layers 11c and 11d extend upwards from the opposing sides of the rod-lens array 5. With the third embodiment having this structure, it is also possible to reduce the leakage of light beams reflected from points near the point P into each photoelectric conversion element 7. The element 7, therefore, outputs a pixel signal faithfully representing that part of the image which is located at the point P.

The light-shielding layers 11c and 11d have a height as long as possible, but low enough to allow light reflected from the point P to reach each rod lens in a sufficient an amount such that the element 7 generates a complete pixel signal.

Fourth Embodiment

For some applications, a contact-type image sensor must be small in size. FIG. 5 is a sectional view of a contact-type image sensor which is small and is a fourth embodiment of the invention. In FIG. 5, those components which are identical to those shown in FIG. 1 are designated with the same reference numerals. The identical components will not be described in detail.

The fourth embodiment comprises an LED array 1, a glass plate 4, a rod-lens array 5, a line sensor 6, a terminal 8, a circuit board 9, a connector 10, a light-shielding layer 11a, and a support 12.

The support 12 is identical in structure to the support 3 shown in FIG. 1, except that a vertical wall 12a replaces the sensor-holding portion 3b, the lens-holding portion 3d and the plate-holding portion 3f. In other words, the left half of the support 12 is identical to the left half of the support 3 (FIG. 1).

The upper end of the vertical wall 12a supports the glass plate 4. The rod-lens array 5 is secured to the middle portion of the wall 12a. The lower end of the wall 12a holds the line sensor 6. Thus, the wall 12a functions as a plate-holding portion, a lens-holding portion, and a sensor-holding portion.

Since the vertical wall 12a replaces the sensor-holding portion 3b, the lens-holding portion 3d and the plate-holding portion 3f, the support 12a is narrower than the support 3 (FIG. 1) by the distance for which the portions 3b and 3f extend sideways.

As shown in FIG. 5, only one light-shielding layer 11a is formed on the lower surface of the glass plate 4. Hence, the layer 11a shields the lights reflected from those points near the point P (i.e., the reading position) which are located closer to the LED array 1, preventing them from reaching the rod-lens array 5. As a result, the leakage of undesired light beams reflected from points near the point P into each photoelectric conversion element 7 is minimized. The element 7 therefore outputs a pixel signal faithfully representing that part of the image which is located at the point P.

Fifth Embodiment

FIG. 6 is a sectional view showing a contact-type image sensor according to a fifth embodiment of this invention. In FIG. 6, those components which are identical to those shown in FIGS. 1, 4, and 5 are designated with the same reference numerals. The identical components will not be described in detail.

The fifth embodiment is identical to the fourth embodiment (FIG. 5), except that a vertical light-shielding layer 11c is secured to one side (i.e., the left side) of the rod-lens array 6, and not formed on the glass plate 4. The layer 11c extends upwardly from the array 6 and is located near the LED array 1. With the third embodiment having this structure, it is also possible to reduce the leakage of lights reflected from points near the point P to each photoelectric conversion element 7. The element 7, therefore, outputs a pixel signal faithfully representing that part of the image which is located at the point P.

The present invention is not limited to the embodiments described above. For example, the invention may be applied to a contact-type image sensor which is incorporated in an apparatus such as a facsimile device, by arranging individual components, i.e., LED array 1, line sensor 6, rod-lens array 5, light-shielding layers (11a, 11b, 11c, 11d), within that apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A contact-type image sensor comprising:
    a light source for applying light to a document to read an image on the document;
    photoelectric conversion means for generating electric signals from an incident light;
    an optical system having an incident portion and designed to guide to said photoelectric conversion means the light applied from said light source and reflected from a predetermined position on the document; and
    light-shielding means having at least one shielding part located in a region between a first plane containing the incident portion of the optical system and a second plane containing the predetermined position and opposing the first plane, the light-shielding means reducing an amount of light that is reflected from a position other than the predetermined position and incident on said optical system.

2. The contact-type image sensor according to claim 1, wherein said light-shielding means is a light-shielding plate.

3. The contact-type image sensor according to claim 1, wherein said light-shielding means is formed on a lower surface of a transparent document table.

4. The contact-type image sensor according to claim 3, wherein said light-shielding means is a light-shielding film adhered to a lower surface of said transparent document table.

5. The contact-type image sensor according to claim 3, wherein said light-shielding means is made of light-shielding material and formed on a lower surface of said document table by coating or printing the material.

6. The contact-type image sensor according to claim 3, wherein said light-shielding means includes at least two light-shielding members which are spaced apart from each other and arranged on opposite sides of the predetermined position.

7. The contact-type image sensor according to claim 3, wherein said light-shielding means includes one light-shielding member located closer to said light source than the predetermined position.

8. The contact-type image sensor according to claim 3, wherein said light-shielding means includes one light-shielding member located adjacent to the light source.

9. The contact-type image sensor according to claim 1, wherein said light-shielding means is secured to said optical system and located at a light-receiving side thereof.

10. The contact-type image sensor according to claim 9, wherein said light-shielding means is a light-shielding plate.

11. The contact-type image sensor according to claim 9, wherein said light-shielding means includes at least two light-shielding members which are spaced apart from each other and arranged on opposite sides of the predetermined position.

12. The contact-type image sensor according to claim 9, wherein said light-shielding means includes one light-shielding member located closer to said light source than the predetermined position.

13. The contact-type image sensor according to claim 9, wherein said light-shielding means includes one light-shielding member located adjacent to the light source.

14. A contact-type image sensor comprising:
    a document table for supporting a document to read an image on the document;
    a light source for applying light to the document supported on said document table;
    photoelectric conversion means for generating electric signals from an incident light;
    support means having a wall extending linearly to said document table;
    an optical system secured to the wall of said support means having an incident portion and designed to guide to said photoelectric conversion means the light applied from said light source and reflected from a predetermined position on the document; and
    light-shielding means having at least one shielding part located in a region between a first plane containing the incident portion of the optical system and a second plane containing the predetermined position and opposing the first plane, the light-shielding means reducing an amount of light that is reflected from a position closer to said light source than the predetermined position and that is incident on said optical system.

15. The contact-type image sensor according to claim 14, wherein said light-shielding means is secured to said optical system and located at a light-receiving side thereof.

16. The contact-type image sensor according to claim 15, wherein said light-shielding means is a light-shielding plate.

17. The contact-type image sensor according to claim 14, wherein said light-shielding means is formed on a lower surface of a transparent document table.

18. The contact-type image sensor according to claim 17, wherein said light-shielding means is a light-shielding plate.

19. The contact-type image sensor according to claim 17, wherein said light-shielding means is a light-shielding film adhered to a lower surface of said transparent document table.

20. The contact-type image sensor according to claim 17, wherein said light-shielding means is made of light-shielding material and formed on a lower surface of said document table by coating or printing the material.

21. A contact-type image sensor comprising:
    a light source for applying light to a document to read an image on the document;
    photoelectric conversion means for generating electric signals from an incident light;
    an optical system having an incident portion and designed to guide to said photoelectric conversion means the light applied from said light source and reflected from a predetermined position on the document; and
    light-shielding means having at least one shielding part located in a region between the incident portion of the optical system and the predetermined position, the light-shielding means for reducing an amount of light that is reflected from a position other than the predetermined position and incident on said optical system.

* * * * *